United States Patent [19]
Yale

[11] 3,886,275
[45] May 27, 1975

[54] METHOD FOR REDUCING HYPERTENSION BY USE OF DERIVATIVES OF 1,2,4-BENZOTHIADIAZINE-4-CARBOXALDEHYDE-1,1-DIOXIDE

[75] Inventor: Harry Louis Yale, New Brunswick, N.J.

[73] Assignee: E. R. Squibb & Sons, Inc., Princeton, N.J.

[22] Filed: Jan. 3, 1974

[21] Appl. No.: 430,448

Related U.S. Application Data

[60] Continuation-in-part of Ser. No. 259,111, June 2, 1972, abandoned, which is a division of Ser. No. 11,906, Feb. 16, 1970, Pat. No. 3,691,162.

[52] U.S. Cl. ................................................. 424/246
[51] Int. Cl. ............................................. A61k 27/00
[58] Field of Search.................. 424/246; 260/243 D

[56] References Cited
UNITED STATES PATENTS

| | | |
|---|---|---|
| 3,290,302 | 12/1966 | Eloy ................................ 260/243 D |
| 3,318,879 | 5/1967 | Wei et al. ....................... 260/243 D |
| 3,344,139 | 9/1967 | Wei et al. ....................... 260/243 D |
| 3,379,735 | 4/1968 | Sturm et al. .................... 260/243 D |

*Primary Examiner*—Albert T. Meyers
*Assistant Examiner*—Daren M. Stephens
*Attorney, Agent, or Firm*—Lawrence S. Levinson; Merle J. Smith; Burton Rodney

[57] ABSTRACT

The present invention pertains to hypotensive agents of the formula

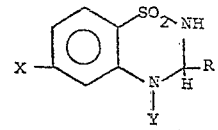

wherein X may be halogen, lower alkyl, trifluoromethyl or nitro; Y may be lower alkyl or lower alkene of at least 3 carbon atoms or —CHO; and R may be hydrogen, lower alkyl, lower cycloalkyl or aralkyl.

7 Claims, No Drawings

METHOD FOR REDUCING HYPERTENSION BY USE OF DERIVATIVES OF 1,2,4-BENZOTHIADIAZINE-4-CARBOXALDEHYDE-1,1-DIOXIDE

RELATED APPLICATION

This application is a continuation-in-part of copending application Ser. No. 259,111 filed June 2, 1972, now abandoned, which latter application is a division of application Ser. No. 11,906 filed Feb. 16, 1970, now U.S. Pat. No. 3,691,162.

OBJECTS OF THE INVENTION

It is an object of the present invention to provide new hypotensive agents and method for their preparation. Another object is to provide compounds which are effective hypotensive agents at relatively low dosages. A further object is to provide hypotensive agents which have prolonged effectiveness. These and other objects of the present invention will be apparent from the following description.

SUMMARY OF THE INVENTION

It has now been found that compounds of the formula

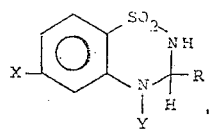

are effective hypotensive agents having prolonged effect at low dosage levels. In the formula above, X may be halogen (F, Cl, Br or I), lower alkyl of up to 5 carbon atoms (including branched as well as straight chain radicals), trifluoromethyl or nitro; Y may be lower alkyl of up to 8 carbon atoms, or lower alkene of from 3 to 8 carbon atoms (including branched as well as straight chain radicals), or —CHO; and R may be lower alkyl or cycloalkyl, each of up to 8 carbon atoms, or aralkyl of up to 10 carbon atoms, or hydrogen.

DETAILED DESCRIPTION

In the compounds of the present invention, the substituent X includes in addition to halogen and nitro the following alkyl radicals: methyl, ethyl, n-propyl, i-propyl, n-butyl, i-butyl, n-pentyl, 2-methyl-n-butyl, or neopentyl. The substituent Y may be any of the foregoing alkyl radicals and in addition also includes the following: n-hexyl, 2-methyl-n-pentyl, 3-methyl-n-pentyl, 2,2-dimethyl-n-butyl, 2,3-dimethyl-n-butyl, n-heptyl, 2-methyl-n-hexyl, 3-methyl-n-hexyl, 2,2-dimethyl-n-pentyl, 2,3-dimethyl-n-pentyl, 2,4-dimethyl-n-pentyl, 3,3-dimethyl-n-pentyl, 3-ethyl-n-pentyl, 2,2,3-trimethylbutane, n-octyl, 2-methyl-n-heptyl, 3-methyl-n-heptyl, 4-methyl-n-heptyl, 2,3-dimethyl-n-hexyl, 2,4-dimethyl-n-hexyl, 2,5-dimethyl-n-hexyl, 2,2-dimethyl-n-hexyl, 3,3-dimethyl-n-hexyl, 2-ethyl-n-hexyl, 3-ethyl-n-hexyl, 2,2,3-trimethyl-n-pentyl, 2,2,4-trimethyl-n-pentyl, 2,3,3-trimethyl-n-pentyl, 2,3,4-trimethyl-n-pentyl, 2-ethyl-3-methyl-n-pentyl, 2-methyl-3-ethyl-n-pentyl, and 2,2,3,3-tetramethyl-n-butyl. The substituent Y may also be a monounsaturated alkene corresponding to any of the foregoing alkyl radicals having from 3 to 8 carbon atoms, specific examples of which are given above, or a cycloalkyl radical of up to 8 carbon atoms, for example, cyclopropyl, cyclobutyl, cyclopentyl, cyclohexyl, methylcyclopentyl, cycloheptyl, cyclooctyl, and methyl cycloheptyl, or an aralkyl radical of up to 10 carbon atoms, for example, benzyl, phenethyl, isopropylphenyl, 3-phenylpropyl and isopropylbenzyl.

The compounds described herein and the physiologically acceptable salts thereof are useful hypotensive agents and are useful in reducing high blood pressure. They may be used, for example, in a manner similar to guanethidine. As to the salts, those coming within the purview of this invention include the acid-addition salts of those compounds containing a basic group particularly the nontoxic acid-addition salts and the nontoxic quaternary ammonium salts. These salts frequently provide convenient means for separating the product from the reaction mixture in which it is produced or from the solvent in which it is extracted in view of their insolubility in various media. Thus the product may be precipitated in the form of an insoluble salt and converted, by conventional techniques, to the free base or to another soluble or insoluble salt as desired.

Such salts are easily prepared by methods known to the art. The base is reacted with either the calculated amount of organic or inorganic acid in aqueous miscible solvents, such as acetone or ethanol, with isolation of the salt by concentration and cooling or an excess of the acid in aqueous immiscible solvent, such as ethyl ether or chloroform, with the desired salt separating directly. Exemplary of such organic salts are those with acetic, oxalic, tartaric, maleic, fumaric, citric, ascorbic, pamoic, succinic, salicylic, bis-methylenesalicylic, benzoic, nicotinic, methylsulfonic, ethanesulfonic, malic, mandelic, cinnamic, citraconic, aspartic, stearic, palmitic, itaconic, glycolic, p-aminobenzoic, glutamic, benzene sulfonic, camphorsulfonic, methanesulfonic, theophylline and theophylline acetic acids as well as with the 8-halotheophyllines, for example, 8-chlorotheophylline and 8-bromotheophylline. Exemplary of such inorganic salts are those with hydrochloric, hydrobromic, hydroiodic, sulfuric, sulfamic, phosphoric and nitric acids.

The quaternary ammonium salts include those formed with alkyl halides (e.g., methyl chloride, isobutyl bromide, dodecyl chloride and cetyl iodide), benzyl halides (e.g., benzyl chloride) and dilower alkyl sulfates (e.g., dimethyl sulfate). Of course these salts may also be prepared by the classical method of double decomposition of appropriate salts which is well known to the art.

A compound of the invention or a physiologically acceptable salt thereof may be compounded according to accepted pharmaceutical practice in oral dosage forms such as tablets, capsules, elixirs or powders or parenterally in an injectable form in a sterile vehicle prepared according to conventional pharmaceutical practice. The dosage level may vary from about 1 mg/kg to about 50 mg/kg.

Liquid oral dosage forms may be prepared by dissolving the hypotensive agent in a suitable solvent, e.g., propylene glycol. Oral tablets may be prepared by incorporating the hypotensive agent into suitable pharmaceutical carriers. Injectable forms may be prepared by incorporating the hypotensive agent in a sterile vehicle, e.g., propylene glycol, according to conventional practice.

The compounds of the invention produce gradual hypotension in mammalian species, e.g., rats and dogs, beginning a few minutes after dosing and yielding a moderate hypotension, i.e., a fall in blood pressure of about 20% or greater about 3 hours after dosing. Return to normal blood pressure does not occur until about 13 or 14 hours after dosing.

When Y is lower alkyl, or lower alkene of at least 3 carbon atoms, the compounds of the present invention are prepared according to the following reaction sequence:

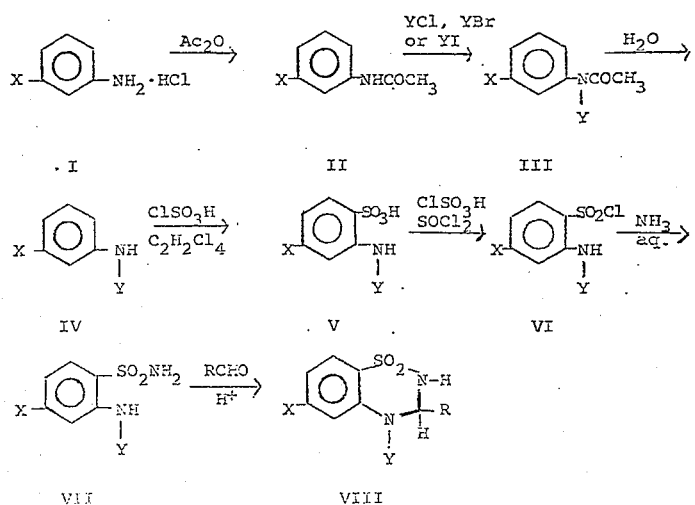

The X-substituted aniline hydrochloride salt I is converted to the N-acetyl derivative II by means of acetic anhydride. Compound III is formed by reaction of II with a Y-halide (chloride, bromide or iodide) under non-aqueous basic conditions at temperatures of from about 30° to about 80°C. Compound III is hydrolyzed under reflux conditions with aqueous base or aqueous alcoholic base to yield Compound IV. Treatment of Compound IV with chlorosulfonic acid in tetrachloroethane at elevated temperatures (90°–150°C) in the presence of a small amount of NaCl yields Compound V. The latter is converted to Compound VI by means of thionyl chloride in the presence of chlorosulfonic acid. Reaction of Compound VI with aqueous ammonia at elevated temperatures (80°–100°C) yields Compound VII. Reaction of VII with an aldehyde in the presence of hydrogen ion yields the final Compound VIII.

When Y is —CHO, the compounds of the present invention are prepared according to the following reaction sequence:

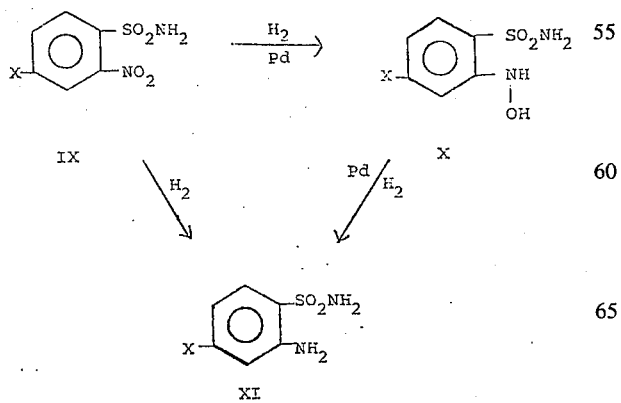

The X-substituted-2-nitrophenylsulfonamide IX is converted to the corresponding 2-hydroxyamino derivative X by hydrogenation in the presence of Pd catalyst. Hydrogenation of the latter in the presence of Pd catalyst at elevated temperatures (from about 50°C to about 60°C) yields the corresponding 2-amino derivative XI. Alternatively, Compound XI may be formed directly from Compound IX by hydrogenation of the latter at elevated temperatures (from about 50°C to about 60°C). Compound XI is converted to Compound XII by reaction with aqueous formaldehyde in the presence of hydrogen ion. Reaction of XII with formic acid yields the final product XIII.

Compound XI may also be prepared according to the following reaction sequence:

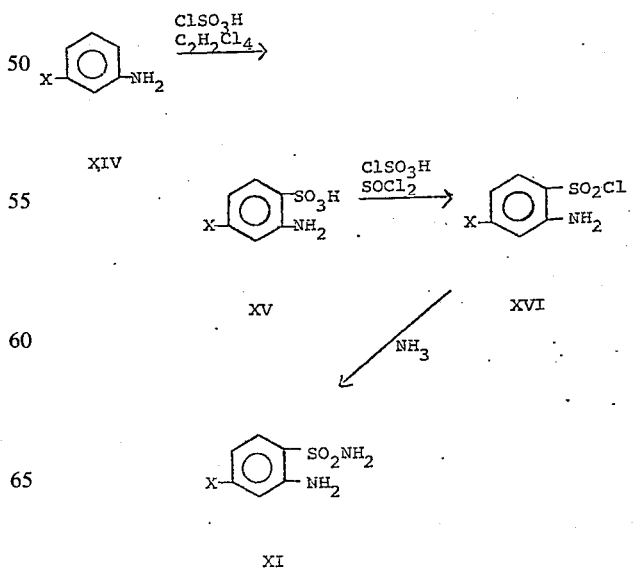

Compound XI is prepared starting from m-x-substituted aniline XIV and converting the latter to the corresponding sulfonic acid XV by reaction with chlorosulfonic acid in tetrachloroethane at elevated temperatures (90°–150°C) in the presence of a small amount of NaCl. Reaction of XV with thionyl chloride in the presence of chlorosulfonic acid yields the sulfonyl chloride derivative XVI. Reaction of the latter with aqueous ammonia at elevated temperatures (80°–100°C) yields Compound XI.

The following examples illustrate the present invention without, however, limiting the same thereto. All temperatures are expressed in degrees Centigrade.

EXAMPLE 1

α,α,α-Trifluoro-m-acetotoluidide

To a vigorously stirred solution of 161.0 g. of α,α,α-trifluoro-m-toluidine in 85 ml. of concentrated hydrochloric acid and 1 l. of water, at room temperature, is added, in one portion, 102.0 g. of acetic anhydride. The acetyl derivative separates rapidly, is filtered, and dried to give 158.4 g. of α,α,α-trifluoro-m-acetotoluidide, m.p. about 95°–97°.

EXAMPLE 2

N-Ethyl-α,α,α-trifluoro-m-acetotoluidide

The acetyl derivative, 158.0 g., 1 l. of dry benzene and 33.5 g. of sodamide are stirred and heated under reflux for 4 hours, cooled to room temperature, and 150.0 g. of ethyl iodide are added. The mixture is heated again under reflux with stirring for 4 hours, cooled, 50.0 g. of ethyl iodide added, and the heating and stirring continued for 18 hours. The usual work-up gives 135.7 g. of N-ethyl-α,α,α-trifluoro-n-acetotoluidide, b.p. about 130°–135° (15 mm.), $n_D^{24}$ 1.4700.

EXAMPLE 3

N-Ethyl-α,α,α-trifluoro-m-toluidine

The N-ethyl derivative, 135.5 g., 500 ml. of 95% ethanol, and 50 ml. of concentrated hydrochloric acid are refluxed for 8 hours and the alcohol is distilled. The residue is treated with an excess of 40% aqueous sodium hydroxide and the liberated oil extracted with ether. The ether extracts are dried, concentrated, and the residue distilled to give 72.0 g of N-ethyl-α,α,α-trifluoro-m-toluidine, b.p. about 82° (4 mm.), $n_D^{24}$ 1.4770.

EXAMPLE 4

2-(Ethylamino)-α,α,α-trifluoro-p-toluenesulfonic acid

To 23.2 g. of N-ethyl-α,α,α-trifluoro-m-toluidine in 320 ml. of tetrachloroethane, is added, with cooling, 15 g. of chlorosulfonic acid, dropwise, then 8.4 g. of sodium chloride. The mixture is heated slowly to reflux, maintained at reflux for 1 hour, cooled, and poured on ice. The solid which separates is filtered to give 12 g. of crude 2-(ethylamino)-α,α,α-trifluoro-p-toluenesulfonic acid, m.p. about 198°–200° dec.; recrystallization from n-propyl alcohol gives 6.0 g. of pure acid, m.p. about 210°–212° dec.

EXAMPLE 5

2-(Ethylamino)-α,α,α-trifluoro-p-toluenesulfonyl chloride

To 25 ml. of chlorosulfonic acid at 0° is added, in portions, the above 6 g. of acid. The mixture is heated at 150° (oil bath temperature), kept at 150° for 3 hours, cooled to room temperature, 10 ml. of purified thionyl chloride added dropwise, and the mixture warmed carefully by means of a steam bath, heated for 1 hour on the steam bath, and poured on ice. The precipitated material is filtered and washed with a little water to give the title compound.

EXAMPLE 6

2-(Ethylamino)-α,α,α-trifluoro-p-toluenesulfonamide

The precipitate from Example 5 is heated on the steam bath for 1 hour with 100 ml. of concentrated aqueous ammonia. The solid in the cooled reaction mixture is filtered, dried and extracted with 100 ml. of boiling benzene. The hot benzene solution is decanted and concentrated to dryness to give 0.35 g. of solid; recrystallization from 20% isopropyl alcohol-80% water gives 2-(ethylamino)-α,α,α-trifluoro-p-toluenesulfonamide, m.p. about 184°–186°.

EXAMPLE 7

3,4-Dihydro-4-ethyl-6-(trifluoromethyl)-1,2,4-benzothiadiazine-1,1-dioxide

2-Ethylamino-α,α,α-trifluoro-p-toluenesulfonamide 5.43 g., 1.28 g. of 37% of formalin solution, 50 ml. of 95% ethanol, and 2.5 ml. of aqueous 10% hydrochloric acid are heated under reflux for 2 hours and the solution concentrated to dryness. The residual solid is recrystallized from water to give the title compound.

EXAMPLE 8

4-Allyl-6-chloro-3-methyl-1,2,4-benzothiadiazine-1,1-dioxide

Substituting m-chloroaniline for α,α,α-trifluoro-m-toluidine in Example 1, allyl chloride for the ethyl iodide in Example 2, and acetaldehyde for the formalin in Example 7, and following the procedures of Examples 1–7, the title product is formed.

EXAMPLE 9

6-Bromo-3-cyclopentyl-4-methyl-1,2,4-benzothiadiazine-1,1-dioxide

Substituting m-bromoaniline for α,α,α-trifluoro-m-toluidine in Example 1, methyl bromide for the ethyl iodide in Example 2, and cyclopentanecarboxaldehyde (in the form of the acetal) for the formalin in Example 7, and following the procedures of Examples 1–7, the title product is formed.

EXAMPLE 10

3-Cyclohexyl-4-ethyl-6-fluoro-1,2,4-benzothiadiazine-1,1-dioxide

Substituting m-fluoroaniline for α,α,α-trifluoroaniline in Example 1, and cyclohexanecarboxaldehyde (in the form of the acetal) for the formalin in Example 7, and following the procedure of Examples 1–7, the title product is formed.

EXAMPLE 11

6-Methyl-3-phenethyl-4-propyl-1,2,4-benzothiadiazine-1,1-dioxide

Substituting m-toluidine for α,α,α-trifluoroaniline in Example 1, propyl chloride for the ethyl iodide in Example 2, and phenethylcarboxaldehyde (in the form of the acetal) for the formalin in Example 7, and following the procedure of Examples 1–7, the title product is formed.

EXAMPLE 12

2-Nitro-α,α,α-trifluoro-p-toluenesulfonamide

A suspension of 367 g. of bis(2-nitro-α,α,α-trifluoro-p-tolyl)disulfide in 1800 ml. of 90% acetic acid is diffused with gaseous chlorine at 35°–40° for 6 hours. The clear solution which forms is concentrated in vacuo from a hot water bath, the residue is treated with 500 ml. of toluene, and the toluene solution, containing the sulfonyl chloride is added dropwise at room temperature to 500 ml. of aqueous ammonia (d 0.9). The solution is heated on the steam bath for 1 hour to give crude title product; this is extracted with 400 ml. of 20% aqueous sodium hydroxide and filtered, and the filtrate treated with excess 20% aqueous hydrochloric acid. The solid is filtered, washed with cold water, and recrystallized from water to give 362 g. of the title compound: m.p. about 169°–170°; $\lambda_{max}^{EtOH}$ mμ (ε) 276 (sh) (16,000), 266 (16,500).

EXAMPLE 13

2-(Hydroxyamino)-α,α,α-trifluoro-p-toluenesulfonamide

Two identical experiments, each involving 30.0 g. of the compound formed in Example 12, 5.0 g. of 5% Pd-C, and 300 ml. of absolute ethanol are shaken at 20°–25° under 50 psi of hydrogen; approximately 0.5 hours is required for the uptake of 0.22 mol. Work-up of the combined runs gives 51.0 g. the title compound; colorless: m.p. about 184°–185° dec after recrystallization from water; $\lambda_{max}^{EtOH}$ mμ (ε) 313 (3100), 247 (8200), 213 (23,300). The compound is soluble in dilute aqueous sodium hydroxide forming an orange-yellow solution; acidification gives a colorless solution from which unchanged title compound precipitates; a test of the compound with aqueous ferric chloride is negative.

EXAMPLE 14

2-Amino-α,α,α-trifluoro-p-toluenesulfonamide

A. By hydrogenation of 2-nitro-α,α,α-trifluoro-p-toluenesulfonamide—Two identical reaction mixtures as in the above experiment are hydrogenated at 50°–60° under 50 psi of hydrogen; approximately 3.5 hours are required for the absorption of 0.33 mol. The two runs are combined and worked up to give 54.0 g of colorless title compound, m.p. about 148°–149° after recrystallization from water; $\lambda_{max}^{EtOH}$ mμ (ε) 320 (4200), 247 (10,000), 213 (24,100). The compound is soluble in dilute aqueous sodium hydroxide forming a colorless solution; acidification precipitates the unchanged compound.

B. By hydrogenation of 2-(hydroxyamino)-α,α,α-trifluoro-p-toluenesulfonamide—A solution of 25.6 g. (0.1 mol.) of the compound formed in Example 13, 5.0 g. of 5% Pd-C, and 300 ml. of absolute ethanol is heated to 50°–60° and shaken under 50 psi of hydrogen. Again, ca. 3 hours are required for the theoretical uptake of hydrogen to occur. Work-up as above gives 21.3 g. of title compound, m.p. about 148°–149° after recrystallization from water.

EXAMPLE 15

3,4-Dihydro-6-trifluoromethyl-1,2,4-benzothiadiazine-1,1-dioxide 0.01 Mol. of the final compound of the preceding example, 0.01 mol. of 37% aqueous formaldehyde, 1.0 ml. of 10% aqueous HCl, and 50 ml. of 95% ethanol are heated under reflux for 3 hours and concentrated to dryness in vacuo. After recrystallization from water the title compound is obtained: m.p. about 163°–165°; $\lambda_{max}^{EtOH}$ mμ (ε) 327 (35,000), 253 (12,500), 213 (22,300).

EXAMPLE 16

3,4-Dihydro-6-(trifluoromethyl)-1,2,4-benzothiadiazine-4-carboxaldehyde-1,1-dioxide A mixture of 2.0 g of the product from Example 15 and 20 ml. of 98–100% formic acid is heated for 1 hour on the steam bath under anhydrous conditions and then concentrated to dryness in vacuo. The crystalline residue, m.p. about 173°–177°, weighs 2.05 g. Recrystallization from 20 ml. of 2-propanol gives 1.57 g of title compound: m.p. about 184.5°–186°, colorless.

EXAMPLE 17

3-Benzyl-3,4-dihydro-6-iodo-1,2,4-benzothiadiazine-4-carboxaldehyde-1,1-dioxide

Substituting m-iodoaniline for the N-ethyl-α,α,α-trifluoro-m-toluidine in Example 4, and following the procedures of Examples 4–6, 15 and 16, the title compound is obtained.

EXAMPLE 18

3.4-Dihydro-6-nitro-1,2,4-benzothiadiazine-4-carboxaldehyde-1,1-dioxide

Substituting m-nitraniline for the N-ethyl-α,α,α-trifluro-m-toluidine in Example 4, and following the procedures of Examples 4–6, 15 and 16, the title compound is obtained.

EXAMPLE 19

3-Benzyl-3,4-dihydro-6-(trifluoromethyl)-1,2,4-benzothiadiazine-4-carboxaldehyde-1,1-dioxide A. 2-Amino-α,α,α-trifluoro-p-toluenesulfonyl chloride To 23.2 g of α,α,α-trifluoro-m-toluidine in 320 ml. of tetrachloroethane is added, with cooling, 15 g. of chlorosulfonic acid, dropwise, then 8.4 g of sodium chloride. The mixture is heated slowly to reflux, maintained at reflux for 1 hour, cooled, and poured on ice. The solid which separates is filtered to give crude 2-amino-α,α,α-trifluoro-p-toluenesulfonic acid; recrystallization from n-propanol gives the pure product. Treating the latter with chlorosulfonic acid according to the procedure of example 5 gives the title compound.

B. 2-Amino-α,α,α-trifluoro-p-toluenesulfonamide

The product from part A is heated on the steam bath for 1 hour with 100 ml of concentrated aqueous ammonia. The solid in the cooled reaction mixture is filtered, dried and extracted with 100 ml of boiling benzene. The hot benzene solution is decanted and concentrated to dryness to give crude 2-amino-α,α,α-trifluoro-p-toluenesulfonamide. The crude product is recrystallized from 20% isopropanol-80% water.

C. 3-Benzyl-3,4-dihydro-6-(trifluoromethyl)-1,2,4-benzothiadiazine-1,1-dioxide

The product from part B, 12.0 g. phenacetaldehyde 6.6g. 50 ml. of 95% ethanol, and 2.5 ml of aqueous 10% hydrochloric acid are heated under reflux for 2 hours and the solution cooled to 0°. The solid that crystallizes is filtered from 2-propanol to give the title compound.

D. 3-Benzyl-3,4-dihydro-6-(trifluoromethyl)-1,2,4-benzothiadiazine-4-carboxaldehyde-1,1-dioxide A mixture of 2.0 g of the product from part C and 20 ml of 98–100% formic acid is heated for 1 hour on the steam bath under anhydrous conditions and then concentrated to dryness in vacuo. The crystalline residue is recrystallized from 20 ml. of 2-propanol to give the title compound.

EXAMPLE 20

Oral Liquid

| Hypotensive agent of Example 7, | 20 grams |
| Propylene glycol, enough to make | 5.0 liters |

The hypotensive agent is dissolved in the propylene glycol, brought up to final volume and packaged in amber glass bottles with tight fitting caps. Each 5 ml contains 20 mg of the active compound. Before swallowing, 5 ml are diluted in 4 oz of water or fruit juice.

EXAMPLE 21

Intramuscular Injection

| Hypotensive agent of Example 7 | 50. gms. |
| Methyl paraben, U.S.P. | 1.0 gm. |
| Propyl paraben, U.S.P. | 0.1 gm. |
| Propylene glycol, to make | 1.0 liters |

The parabens and the hypotensive agent are dissolved in the glycol under $N_2$ protection. If necessary, the solution is heated to about 35°C to facilitate solution. Propylene glycol is added to adjust to final volume. The solution is sterilized by passing through a sterile millipore membrane and the sterile product collected in sterile glass containers, suitably protected from light.

The preparation is packaged in multiple-dose vials. Each ml provides 50 mg of the drug and is intended for intramuscular injection.

EXAMPLE 22

Oral Tablet

| | 100,000 Tablets |
|---|---|
| Hypotensive agent of Example 16 | 2.0 Kg |
| Corn starch | 0.6 Kg |
| Stearic acid, fine powder | 0.2 Kg |
| Lactose | 12.5 Kg |
| Acacia | 0.3 Kg |
| Starch paste (20% solids)(USE 1.0 Kg) | 0.2 Kg |
| Water, distilled, enough to granulate | |
| Final Weight | 15.8 Kg |

The lactose and acacia are mixed and granulated with the starch paste by first forming a damp mixture, comminuting, drying and oscillating. The drug substance, the corn starch and the stearic acid are mixed and passed through a fine screen, mixed with the lactose granulation and compressed into tablets. Each tablet weighs 158 mg and contains 20 mg of drug.

While general methods have been given for the preparation of the compounds of the present invention, and specific illustrations of these methods have been given in the preceding examples, it is to be understood that reaction conditions and reactants may be varied in accordance with the knowledge of those skilled in the art.

What is claimed is:

1. A method of reducing hypertension which comprises administering in dosage form to a host in need thereof from about 1 mg/kg to about 50 mg/kg of a compound of the formula

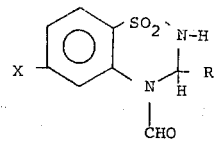

wherein X is halogen, alkyl of up to 5 carbon atoms, trifluoromethyl or nitro, and R is hydrogen, alkyl or cycloalkyl of up to 8 carbon atoms, or arylalkyl of up to 10 carbon atoms.

2. A method according to claim 1 wherein the compound is 3-benzyl-3,4-dihydro-6-(trifluoromethyl)-1,2,4-benzothiadiazine-4-carboxaldehyde-1,1-dioxide.

3. A method according to claim 1 wherein the compound is 3,4-dihydro-6-(trifluoromethyl)-1,2,4-benzothiadiazine-4-carboxaldehyde-1,1-dioxide.

4. A method according to claim 1 wherein the compound is 3-benzyl-3,4-dihydro-6-iodo-1,2,4-benzothiadiazine-4-carobxaldehyde-1,1-dioxide.

5. A method according to claim 1 wherein the compound is 3,4-dihydro-6-nitro-1,2,4-benzothiadiazine-4-carboxaldehyde-1,1-dioxide.

6. A method according to claim 1 wherein the compound is in the form of a physiologically acceptable salt.

7. A composition in dosage form for reducing hypertension which comprises a hypotensive amount of a compound of the formula

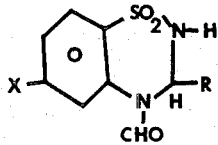

wherein X is halogen, alkyl of up to 5 carbon atoms, trifluoromethyl or nitro, and R is hydrogen, alkyl or cycloalkyl of up to 8 carbon atoms, or arylalkyl of up to 10 carbon atoms, in combination with a physiologically acceptable carrier.

* * * * *